(12) United States Patent
Dolan (10) Patent No.: US 12,491,468 B2
(45) Date of Patent: Dec. 9, 2025

(54) ELIMINATION OF RECYCLE COMPRESSOR IN DEHYDRATION AND CONTAMINANT REMOVAL SYSTEMS

(71) Applicant: BASF CORPORATION, Florham Park, NJ (US)

(72) Inventor: William B. Dolan, Iselin, NJ (US)

(73) Assignee: BASF Corporation, Florham Park, NJ (US)

( * ) Notice: Subject to any disclaimer, the term of this patent is extended or adjusted under 35 U.S.C. 154(b) by 296 days.

(21) Appl. No.: 18/265,054

(22) PCT Filed: Dec. 3, 2021

(86) PCT No.: PCT/US2021/061888
§ 371 (c)(1),
(2) Date: Jun. 2, 2023

(87) PCT Pub. No.: WO2022/120228
PCT Pub. Date: Jun. 9, 2022

(65) Prior Publication Data
US 2024/0001285 A1  Jan. 4, 2024

Related U.S. Application Data

(60) Provisional application No. 63/121,522, filed on Dec. 4, 2020.

(51) Int. Cl.
*B01D 53/047* (2006.01)
*B01D 53/26* (2006.01)

(52) U.S. Cl.
CPC .. *B01D 53/047* (2013.01); *B01D 2259/40054* (2013.01); *B01D 2259/403* (2013.01)

(58) Field of Classification Search
CPC .... B01D 53/04; B01D 53/047; B01D 53/261; B01D 2256/245; B01D 2257/304;
(Continued)

(56) References Cited

U.S. PATENT DOCUMENTS 3,712,027 A * 1/1973 Hasz .................. C07C 7/12
95/143
4,988,490 A  1/1991 Nicholas et al.
(Continued)

OTHER PUBLICATIONS

International Search Report and Written Opinion of International Application No. PCT/US2021/061888 mailed Mar. 31, 2022, 10 pgs.
(Continued)

*Primary Examiner* — Frank M Lawrence, Jr.
(74) *Attorney, Agent, or Firm* — Peter DiMauro (57) ABSTRACT

Disclosed herein is a system including at least two adsorbent bed containing vessels in adsorption mode, where one has a high pressure PI and one has a low pressure P3, and at least one adsorbent bed containing vessel in regeneration mode. The vessel that is in regeneration mode may have a pressure P2 that is intermediate to the pressures PI and P3 of each of the vessels that are in adsorption mode. The system may be configured to introduce a gas feed stream into the high pressure (P3) vessel to generate a first product stream, followed by passing a slip stream from the first product stream, to act as a regeneration gas, into the vessel that in regeneration mode, followed by passing the regeneration gas into the low pressure (P3) vessel, without passing through a compressor, to generate a second product stream.

20 Claims, 3 Drawing Sheets

(58) Field of Classification Search
CPC .......... B01D 2257/504; B01D 2257/80; B01D 2259/40054; B01D 2259/403; B01D 2259/40052; B01D 2259/404; B01D 2259/406; C10L 3/101; C10L 3/106; C10L 2190/12; C10L 2190/542
USPC .............. 95/96–99, 104–106, 114, 115, 117, 95/121–126, 143; 96/121, 122, 126, 130, 96/143, 144, 146; 34/472, 473, 80
See application file for complete search history.

(56) References Cited

U.S. PATENT DOCUMENTS

| | | |
|---|---|---|
| 6,293,998 B1 | 9/2001 | Dolan et al. |
| 6,444,012 B1 | 9/2002 | Dolan et al. |
| 2005/0098034 A1 | 5/2005 | Gittleman et al. |
| 2007/0267328 A1 | 11/2007 | Newmann et al. |
| 2010/0121126 A1* | 5/2010 | Northrop ............... B01D 53/04 48/128 |
| 2013/0192299 A1 | 8/2013 | Dolan et al. |
| 2014/0326136 A1* | 11/2014 | Doong ............... B01D 53/0462 95/41 |
| 2018/0200664 A1 | 7/2018 | Tafreshi et al. |
| 2018/0257020 A1 | 9/2018 | Tafreshi et al. |
| 2020/0114308 A1 | 4/2020 | Dolan et al. |
| 2020/0355428 A1* | 11/2020 | Coleman ................ F25J 3/0223 |
| 2023/0182065 A1* | 6/2023 | Venkatesan ............. C10L 3/106 95/10 |
| 2023/0201758 A1* | 6/2023 | Grahl ....................... C10G 5/02 95/139 |

OTHER PUBLICATIONS

EP Search Report issued in EP Application 21901570.8 mailed Nov. 11, 2024.

* cited by examiner

ELIMINATION OF RECYCLE COMPRESSOR IN DEHYDRATION AND CONTAMINANT REMOVAL SYSTEMS

CROSS-REFERENCE TO RELATED APPLICATION(S)

This application claims the benefit of priority of U.S. Provisional Patent Application No. 63/121,522, filed on Dec. 4, 2020, the disclosure of which is hereby incorporated by reference herein in its entirety.

TECHNICAL FIELD

The present disclosure relates to a process and a system for contaminant removal systems, such, for dehydration systems and contaminant removal systems.

BACKGROUND

In conventional natural gas conditioning, natural gas is often dehydrated or cleared from contaminants by passing the natural gas through a system of vessels or units referred to as a dehydration unit or a contaminant removal unit including adsorption beds made up of adsorbent material (e.g., molecular sieve particulate material). Such a system includes at least two vessels in which one of the vessels contains saturated adsorbent (e.g., saturated molecular sieve) that is in regeneration mode, while the other one or more vessels are operated in dehydration or adsorption mode. During dehydration mode and/or adsorption mode, water and/or contaminants are adsorbed onto the adsorbent (e.g., molecular sieve material); and during regeneration mode, water and/or contaminants are desorbed from the adsorbent (e.g., molecular sieve). Typically, the regeneration is effected by passing hot dry natural gas, i.e., natural gas having been dehydrated or decontaminated from heavy hydrocarbons (e.g., C5+ hydrocarbons), over the saturated adsorbent (e.g., molecular sieve). This requires a large compressor to return hot dry natural gas to a location upstream of the dehydration unit. Improving the dehydration process is an ongoing endeavor.

SUMMARY

The following summary presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In some embodiments, the present disclosure may be directed to a process that includes (a) introducing a gas feed stream to a first adsorbent bed containing vessel in adsorption mode to generate a first product stream; (b) passing a slip stream from the first product stream into a second adsorbent bed containing vessel in regeneration mode such that the slip stream is used as a regeneration gas for the second adsorbent bed containing vessel; and (c) introducing the regeneration gas from an outlet stream of the second adsorbent bed containing vessel into a third adsorbent bed containing vessel in adsorption mode to generate a second product stream. The first adsorbent bed containing vessel in adsorption mode has a first pressure (P1), the second adsorbent bed containing vessel in regeneration mode has a second pressure (P2), and the third adsorbent bed containing vessel in adsorption mode has a third pressure (P3), wherein P2 is an intermediate pressure between P1 and P3 such that P1>P2>P3.

In certain embodiments, all portions of a first bed in the first adsorbent bed containing vessel and all portions of a third bed in the third adsorbent bed containing vessel, in adsorption mode, have a temperature that is at least 75° C. lower than the temperature of a second bed in the second adsorbent bed containing vessel that is in regeneration mode.

In certain embodiments, any of the processes described herein include combining an additional gas feed stream with the regeneration gas from the outlet stream of the second adsorbent bed containing vessel; and introducing the combination of the regeneration gas from the outlet stream of the second adsorbent bed containing vessel and the additional gas feed stream into the third adsorbent bed containing vessel.

In certain embodiments, any of the processes described herein include heating the slip stream prior to passing the slip stream into the second adsorbent bed containing vessel in regeneration mode.

In certain embodiments, any of the processes described herein include condensing water and/or hydrocarbon liquids from the regeneration gas in the outlet stream of the second adsorbent bed containing vessel; and separating the water and/or hydrocarbon liquids and gas from the outlet stream of the second adsorbent bed containing vessel to form a water and/or hydrocarbon liquids stream and a regeneration gas stream.

In certain embodiments, the regeneration gas being introduced into the third adsorbent bed containing vessel does not pass through a compressor between the outlet from the second adsorbent bed containing vessel and an inlet to the third adsorbent bed containing vessel.

In one embodiment, the regeneration gas being introduced into the third adsorbent bed containing vessel bypasses a compressor between the outlet from the second adsorbent bed containing vessel and an inlet to the third adsorbent bed containing vessel.

In certain embodiments, any of the processes described herein may be repeated a number of times that corresponds to a number of adsorbent bed containing vessels in adsorption mode until a final product stream is generated. In certain embodiments, the number of adsorbent bed containing vessels in adsorption mode range from 2 to 10, from 2 to 8, from 2 to 6, or from 2 to 4.

In certain embodiments, any of the processes described herein further include combining the final product stream with portions of the first product stream not passed in the slip stream as a regeneration gas.

In certain embodiments, the processes and systems described herein may be suitable with at least one of natural gas feeds, olefin stream, or wet air feeds.

In certain embodiments, the present disclosure may be directed to a process that includes cycling four or more adsorbent bed containing vessels in a system from (a) through (d), wherein: (a) includes a high pressure adsorbent bed containing vessel in adsorption mode having a pressure P1; (b) includes a low pressure adsorbent bed containing vessel in adsorption mode having a pressure P3; (c) includes an adsorbent bed containing vessel in regeneration mode on heating having a pressure P2$h$; and (d) includes an adsorbent bed containing vessel in regeneration mode on cooling having a pressure P2$c$, wherein P2$h$ and P2$c$ are an intermediate pressure between P1 and P3 such that P1>(P2$h$ and P2$c$)>P3.

In certain embodiments, cycling includes, at any given cycle: introducing a gas feed stream into (a) to generate a first product stream; subsequently, passing a slip stream of the first product stream into at least one of (c) or (d) such that the slip stream is used as a regeneration gas for (c) or (d); and subsequently, introducing the regeneration gas from an outlet stream of at least one of (c) or (d) into (b), without passing the regeneration gas through a compressor, to generate a second product stream.

In certain embodiments, cycling includes adjusting the pressure in the four or more beds in the adsorption system such that: (a) in a first step becomes (b) in a second step; (b) in the first step becomes (c) in the second step; (c) in the first step becomes (d) in the second step; and (d) in the first step becomes (a) in the second step.

In certain embodiments, the present disclosure may be directed to a system that includes: (a) a high pressure adsorbent bed containing vessel in adsorption mode having a pressure P1; (b) a low pressure adsorbent bed containing vessel in adsorption mode having a pressure P3; and at least one of: (c) an adsorbent bed containing vessel in regeneration mode on heating having a pressure P2$h$; and (d) an adsorbent bed containing vessel in regeneration mode on cooling having a pressure P2$c$, wherein P2$h$ and P2$c$ are intermediate pressures between P1 and P3 such that P1>(P2$h$ and P2$c$)>P3. In certain embodiments, the system is configured to: introduce a gas feed stream into (a) to generate a first product stream; subsequently, pass a slip stream of the first product stream into at least one of (c) or (d) such that the slip stream is used as a regeneration gas for at least one of (c) or (d); and subsequently, introduce the regeneration gas from an outlet stream of at least one of (c) or (d) into (b), without the regeneration gas passing through a compressor between an outlet of (c) or (d) and an inlet of (b), to generate a second product stream.

In certain embodiments, all portions of a bed in (a) and all portions of a bed (b) have a temperature that is at least 75° C. lower than the temperature of a bed in (c) or a bed in (d).

In certain embodiments, any of the systems described herein are configured to adjust the pressure in (a) through (d) cyclically such that: (a) in a first step becomes (b) in a second step; (b) in the first step becomes (c) in the second step; (c) in the first step becomes (d) in the second step; and (d) in the first step becomes (a) in the second step.

In certain embodiments, any of the systems described herein are further configured to combine an additional gas feed stream with the regeneration gas from the outlet stream of (c) or (d); and subsequently, introduce the combination of the regeneration gas from the outlet stream of (c) or (d) and the additional gas feed stream into (b).

In certain embodiments, any of the systems described herein may further include a heater proximate to an inlet into (c), the heater configured to heat the slip stream prior to passing the slip stream into (c).

In certain embodiments, any of the systems described herein may further include a condenser connected to a separator, proximate to the outlet of (c), wherein the condenser is configured to condense water and/or hydrocarbon liquids from the regeneration gas in the outlet stream of (c); and wherein the separator is configured to separate the water and/or hydrocarbon liquids and gas from the outlet stream of (c) to form a water and/or hydrocarbon liquids stream and a regeneration gas stream.

In certain embodiments, any of the systems described herein may further include at least one or more additional adsorbent bed containing vessels in adsorption mode. For instance, the systems described herein may include from 1 to 8, from 1 to 6, from 1 to 4, or from 1 to 2 additional adsorbent bed containing vessels in adsorption mode.

In certain embodiments, any of the systems described herein may further include one or more flow controllers, each positioned, proximate to a corresponding inlet stream into one or more of (a), (b), or the at least one or more additional adsorbent bed containing vessels in adsorption mode. In certain embodiments, the one or more flow controllers are configured to split flows into the corresponding inlet streams unevenly to compensate for a portion of the inlet stream introduced from the regeneration gas from the outlet stream of (c) or (d).

In certain embodiments, any of the systems described herein may further include a valve, positioned downstream of an output stream exiting from at least one of (a), (b), or the at least one or more additional adsorbent bed containing vessels. In certain embodiments, the valve is configured to adjust pressure of the output stream so as to combine the output stream with portions of product stream that were not passed into the slip stream.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

Figure 1:
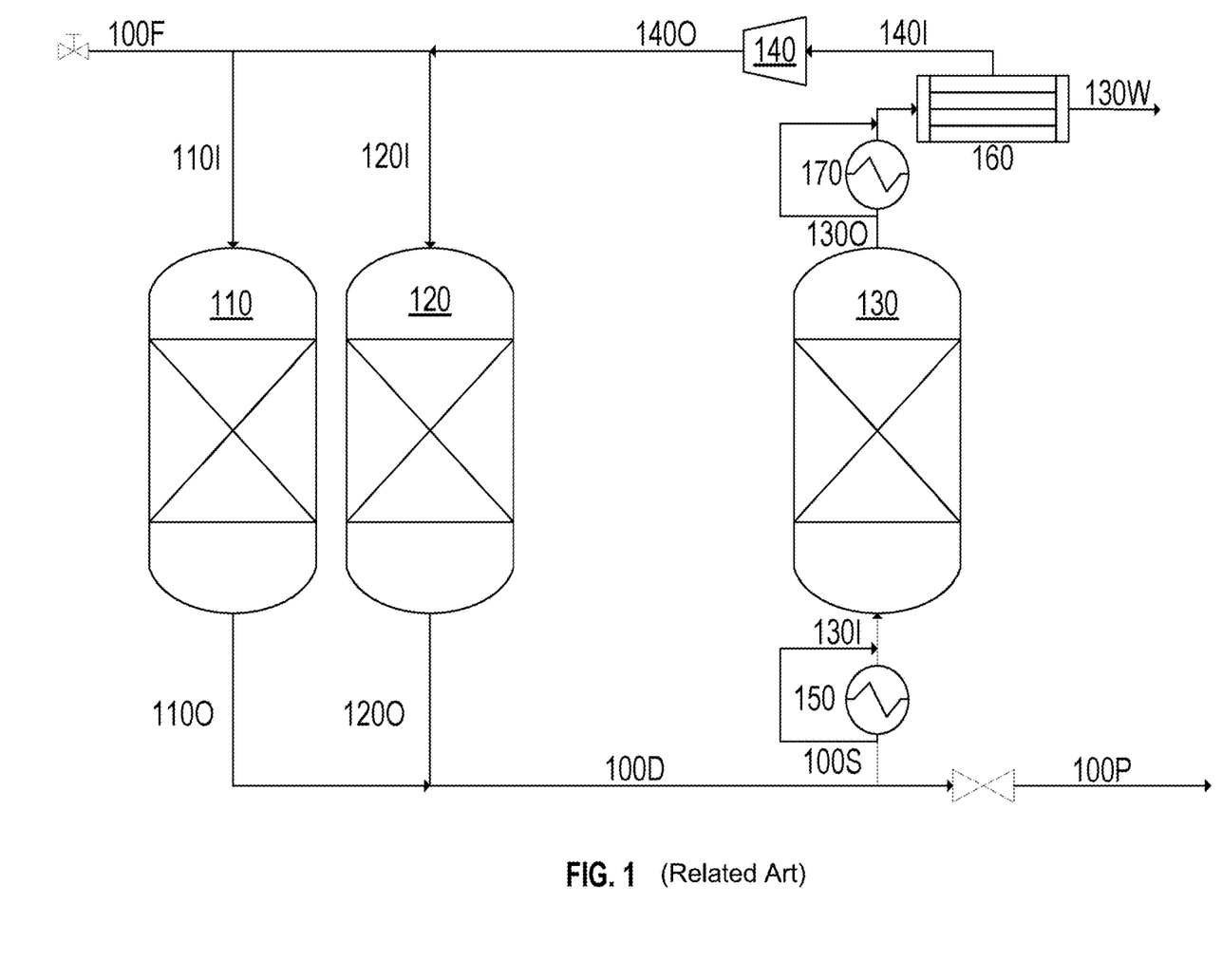
FIG. 1 illustrates a simplified diagram of a first conventional dehydration and/or contaminant removal system.

Referring to FIG. 1, dehydration and/or contaminant removal from a gas such as a natural gas feed stream is typically done by flowing a wet gas feed stream 100F comprising a wet gas over a bed of an adsorbent material (not shown) in one or more vessels, such as vessels 110 and/or 120. When more than one adsorbent bed containing vessel is in adsorption mode, as shown in FIG. 1, the wet gas feed stream 110F may be split evenly between the adsorbent bed containing vessels in adsorption mode. In FIG. 1, stream 100F may be split evenly into inlet streams 110I and 120I entering vessels 110 and 120, respectively. A flow controller for splitting stream 100F into 110I and 120I may be optionally included. In conventional dehydration and/or contaminant removal units, vessels 110 and 120 have the same pressure.

When operating vessels 110 and 120 in adsorption mode, the adsorbent material in these vessels becomes saturated with water and/or contaminants (e.g., heavy hydrocarbons such as C5+ hydrocarbons) and must be regenerated after a period of use. The adsorbent is regenerated in vessel 130 at high temperature by flowing dry regeneration gas 130I, which is typically a slip stream (100S) of dried process gas (100D) exiting from vessels 110 (e.g., 110O) and 120 (e.g., 120O) after having been flown over the bed of adsorbent material in vessels 110 and 120.

Prior to the slip stream (100S) passing into vessel 130 to act as a regeneration gas, it may be heated with heater 150 to generate a hot regeneration gas (130I) to enter vessel 130, which is in regeneration mode. The regeneration gas exiting from vessel 130 (130O) is cooled (e.g., after passing through condenser 170) and free water and/or hydrocarbon liquids 130W is separated in a separator 160 and removed, and the remaining gas 140I is compressed by a compressor 140 and returned through stream 140O to the front-end of the dehydration and/or contaminant removal unit, where it is combined with the gas feed stream 100F and restarts the process. The part of the dried process gas 100D that is not passed as a slip stream 100S to act as a regeneration gas, constitutes the product gas 100P. The quantity of regeneration gas available is limited, among other factors, by the capacity of the compressor 140. Furthermore, if the compressor is 140 becomes inoperable, the entire dehydration unit becomes inoperable and precious operation time is lost.

The instant disclosure provides a dehydration and/or contaminant removal process and a dehydration and/or contaminant removal system in which the compressor 140 may be bypassed or eliminated altogether. The ability to eliminate and/or bypass a process unit, such as a compressor, can reduce capital expense, operating expense, and improve reliability.

Figure 2:
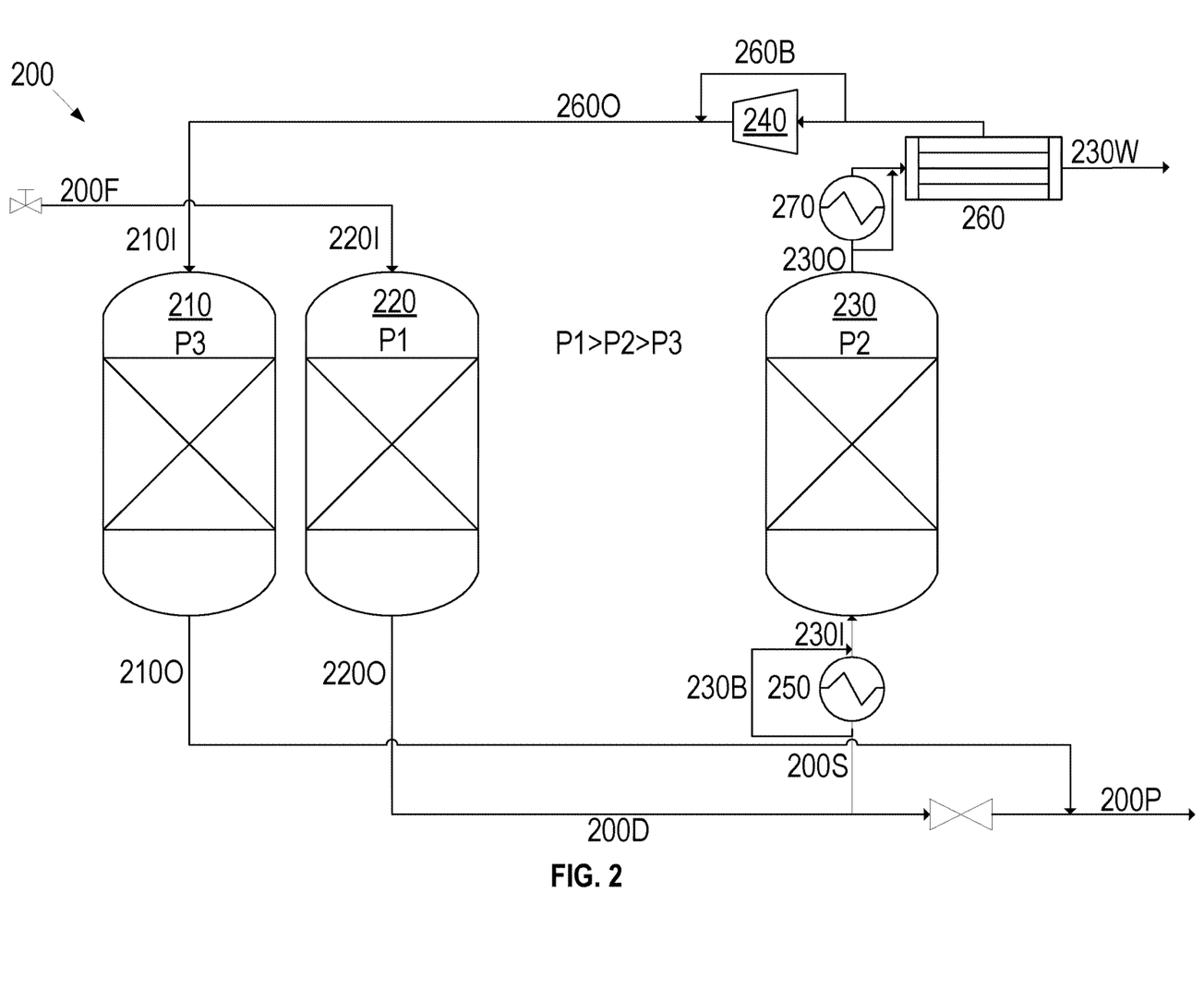
FIG. 2 illustrates a simplified diagram of a contaminant removal system according to an embodiment.

In certain embodiments, referring to FIG. 2, a system 200 and its operation for gas dehydration and/or contaminant removal will now be described. The gas dehydration and/or contaminant removal unit includes at least three adsorbent bed containing vessels 210, 220, and 230. Of the three adsorbent bed containing vessels depicted in FIG. 2, two adsorbent containing vessels, 210 and 220, are in adsorption mode (or dehydration mode and/or contaminant removal mode) and one is in regeneration mode, 230. Although three adsorbent bed containing vessels are shown in FIG. 2, in certain embodiments, the number of adsorbent bed containing vessels may range from any of 3, 4, 5, or 6 to any of 7, 8, 9, or 10. Regardless of the number of adsorbent bed containing vessels, at any given time, at least two adsorbent bed containing vessels will be in adsorption mode and at least one of the adsorbent bed containing vessels will be in regeneration mode for purposes of the embodiments contemplated herein.

In one embodiment, the number of adsorbent bed containing vessels that are in adsorption mode may range from 2 to 10. In one embodiment, the number of adsorbent bed containing vessels that are in adsorption mode may range from 2 to 8. In one embodiment, the number of adsorbent bed containing vessels that are in adsorption mode may range from 2 to 6. In one embodiment, the number of adsorbent bed containing vessels that are in adsorption mode may range from 2 to 4. The vessels in the dehydration and/or contaminant removal unit alternate between being in adsorption mode (or dehydration mode and/or contaminant removal mode) and being in regeneration mode throughout a complete dehydration and/or contaminant removal cycle, as will be described in further detail below.

As used herein, when an adsorbent bed containing vessel is in adsorption mode, all portions of the bed in said vessel (e.g., all portions of the bed of vessel 210 and all portions of the bed of vessel 220) have a temperature that is at least about 75° C. lower than the temperature of a bed in an adsorbent bed containing vessel that is in regeneration mode on heating or cooling. In certain embodiments, the temperature of an adsorbent bed containing vessel that is in regeneration mode ranges from about 150° C. to about 350° C. In certain embodiments, the temperature of an adsorbent bed containing vessel that is in adsorption mode ranged from about 0° C. to about 50° C.

The operation of the embodiment depicted in FIG. 2 will be described in detail herein. It should be understood that a similar mode of operation would apply when there are more than 3 adsorbent bed containing vessels in a given dehydration and/or contaminant removal system.

In FIG. 2, each of the adsorbent bed containing vessels that are in adsorption mode, 210 and 220, have a feed gas inlet, 210I and 220I, respectively. Similarly, each of the adsorbent bed containing vessels, 210 and 220, have a dried gas outlet, 210O and 220O, respectively. The adsorbent bed containing vessel that is in regeneration mode, 230, also has a regeneration gas 230I inlet and a regeneration gas 230O outlet.

Vessels 210 and 220 are shown in adsorption mode (e.g., dehydration mode and/or contaminant removal mode), such that moisture and/or contaminant containing feed gas 210I and 220I is introduced at the top of the vessels and dehydrated and/or decontaminated stream 210O and 220O exits at the bottom of the vessels. After a period of use, the adsorbent material in vessels that operate in adsorption mode becomes saturated with water and/or contaminant (e.g., heavy hydrocarbons such as C5+ hydrocarbons) and transitions to operating in regeneration mode to be regenerated for a period of time to remove the water and/or the contaminant. Following regeneration, the adsorbent material is typically cooled prior to returning the adsorbent material to service in adsorption mode.

Vessel 230 in regeneration mode contains saturated adsorbent material. As shown, vessel 230 has a regeneration gas 230I inlet at the bottom thereof, and a regeneration gas 230O outlet at the top thereof, such that the regeneration gas flows counter-currently. In some embodiments (not shown), vessel 230 can have the regeneration gas inlet at the top of the vessel and the regeneration gas outlet at the bottom of the vessel such that the regeneration gas flows co-currently, as would be apparent to one of ordinary skill in the art. Each of the at least two vessels has two ends wherein each end has an opening therein. Each opening acts as either a vessel inlet or a vessel outlet depending on the direction of fluid flow through the vessel. In one embodiment, a valve (not shown) is located proximate and in fluid communication with each of the two ends of the vessels for controlling flow to and from the opening, acting as either a vessel inlet or vessel outlet.

The adsorbent is regenerated in vessel 230 at high temperature by flowing a regeneration gas 230I over the bed of adsorbent material in vessel 230. The regeneration gas 230I is typically initiated by taking a slip stream of filtered dried process gas (as shown for slip stream 100S in FIG. 1). In the embodiments contemplated herein, the slip stream may be a portion of filtered dried process gas exiting from some (but not all) of the outlet streams of the adsorbent bed containing vessels that are in adsorption mode. As shown in FIG. 2, in certain embodiments, the slip stream 200S is a portion of the filtered dried process gas exiting from vessel 220 (220O or 200D).

In certain embodiments, the slip stream 200S acts as regeneration gas for vessel 230 which is in regeneration mode. Slip stream 200S may be heated via heater 250 to a temperature sufficient to desorb water and/or contaminants (e.g., heavy hydrocarbons such as C5+ hydrocarbons) from the saturated adsorbent material and may be passed to the regeneration gas 230I inlet of the vessel in regeneration mode such that the slip stream may be used as a regeneration gas for passing over and thereby desorbing water and/or contaminants from the adsorbent material within the vessel 230.

The regeneration gas then leaves the vessel 230 and may be cooled via condenser 270 in communication with the regeneration gas 230O outlet of the vessel 230 for cooling an overhead stream from the regeneration gas 230O outlet to form a stream containing water and/or hydrocarbon liquids and gas. The regeneration gas 230O may pass to a separator 260 where free water and/or hydrocarbon liquids 230W may be separated and removed, and a gas stream 260O, also referred to as the regeneration gas stream, may be formed. Rather than compressing the regeneration gas stream 260O through compressor 240, as done in a conventional dehydration system (such as shown in FIG. 1), the regeneration gas stream 260O is introduced into the inlet of adsorbent bed containing vessel 210 that is in adsorption mode to generate a second product stream 210O. In one embodiments, compressor 240 may be omitted altogether from the dehydration and/or contaminant removal system 200. In alternative embodiments, compressor 240 may be bypassed, e.g., via bypass stream 260B. For example, if compressor 240 is out of repair or is undergoing maintenance, system 200 can remain operational by bypassing compressor 240 via bypass stream 260B. The second product stream 210O is combined with a portion of the first product stream 220O (or 200D) which was not redirected into the slip stream 200S. The combination of these streams constitutes the dried product gas 200P.

In the embodiment depicted in FIG. 2, the first adsorbent bed containing vessel 210 that is in adsorption mode has a low pressure P3, the second adsorbent bed containing vessel 220 that is in adsorption mode has a high pressure P1, and the third adsorbent bed containing vessel 230 has a pressure P2 that is an intermediate pressure between P1 and P3 such that P1>P2>P3. In this manner, the system illustrated in FIG. 2 is configured to introduce a gas feed stream 200F (or 220I) into vessel 220 (a high pressure adsorbent bed containing vessel in adsorption mode having a pressure P1); subsequently, pass a slip stream 200S of the first product stream 220O (or 200D) into vessel 230 (an adsorbent bed containing vessel in regeneration mode on heating having a pressure P2$h$) such that the slip stream 200S is used as a regeneration gas 230I for vessel 230; and subsequently, introduce the regeneration gas from the outlet stream of vessel 230 (230O) into vessel 210 (a low pressure adsorbent bed containing vessel in adsorption mode having a pressure P3), without the regeneration gas from the outlet 230O (or 260O) passing through a compressor between the outlet of vessel 230 and the inlet of vessel 210. After passing through vessel 210, a second product stream 210O is generated.

This description refers to a scenario where vessel 230 is an adsorbent bed containing vessel in regeneration mode on heating having a pressure P2$h$. In certain embodiments, following regeneration of a vessel, the vessel is cooled. The skilled artisan would understand that in the cooling step, regeneration gas follows nearly the same path as during regeneration, except that the regeneration gas bypasses the heater (e.g., via bypass stream 230B), such that cool regeneration gas is passed into the adsorbent bed containing vessel 230 to return it to a temperature that is appropriate for adsorption. Hence, a description similar to the one provided for the heating scenario, would also apply to a scenario when vessel 230 is an adsorbent bed containing vessel in regeneration mode on cooling having a pressure P2$c$.

Similarly, the skilled artisan would understand that a similar description would also apply to a scenario when vessel 230 is an adsorbent bed containing vessel in regeneration mode on heating having a pressure P2$h$ and when there is an additional adsorbent containing vessel in regeneration mode on cooling having a pressure P2$c$.

In the embodiment shown in FIG. 2, since the pressure P1 of vessel 220 is higher than the pressure P2 (whether P2$h$ or P2$c$) of vessel 230, the slip stream 200S may flow out of the first product stream 200D (or 220O) due to the pressure differential between P1 and P2 (whether P2$h$ or P2$c$). There may be an additional valve and/or flow controller (not shown) configured to control the portion of the first product stream 200D (or 220O) that gets passed into the slip stream 200S. In certain embodiments, the portion of the first product stream 200D (or 220O) that gets passed into the slip stream 200S ranges from any of about 5 vol %, about 10 vol %, or about 12 vol % to any of about 15 vol %, about 20 vol %, about 25 vol %, or about 30 vol %, based on the total volume of the first product stream 200D (or 220O). In certain embodiments, the portion passed into the slip stream 200S may be dictated by the size of the heater 250 and/or the size of the vessel 230 and/or the size of the condenser 270 and/or the size of the separator 260.

In the embodiments shown in FIG. 2, since the pressure P2 (whether P2$h$ or P2$c$) of vessel 230 is higher than the pressure P3 of vessel 210, the regeneration gas stream 260O may flow into vessel 210 due to the pressure differential between P2 (whether P2$h$ or P2$c$) and P3. In certain embodiments, regeneration gas stream 260O may be combined with an additional gas feed stream (e.g., 310F in FIG. 3), and the combination of regeneration gas stream and the additional gas feed stream 310F may be introduced as inlet stream entering into the low pressure adsorbent bed containing vessel that is in adsorption mode, as will be described in further detail with respect to FIG. 3.

Figure 3:
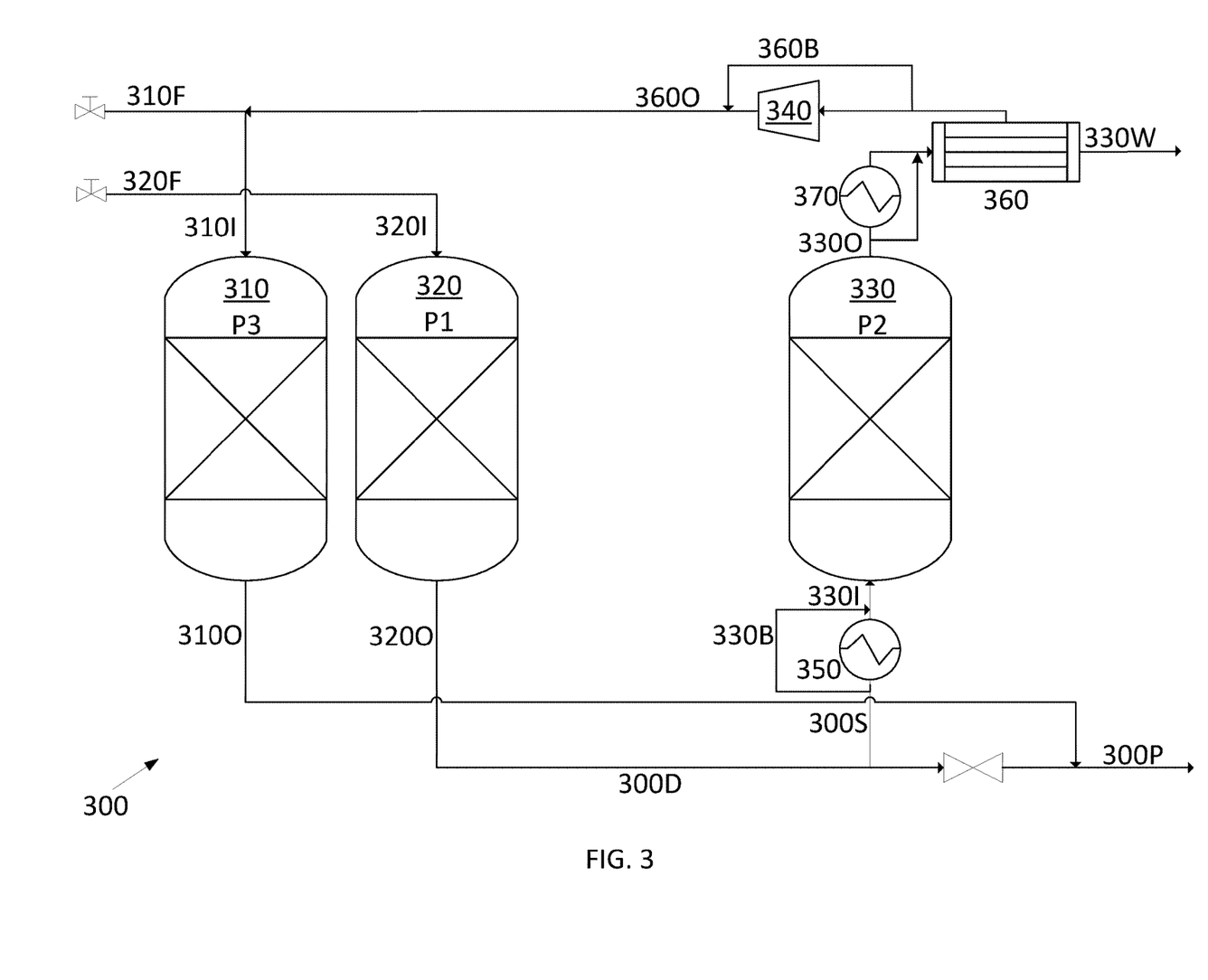
FIG. 3 illustrates a simplified diagram of a contaminant removal system according to an embodiment.

Referring to FIG. 3, a system 300 and its operation for gas dehydration will now be described. System 300 is similar to system 200 and is configured to operate similar to system 200. System 300 includes at least three adsorbent bed containing vessels 310, 320, and 330. Of the three adsorbent bed containing vessels depicted in FIG. 3, two adsorbent containing vessels, 310 and 320, are in adsorption mode (or dehydration mode or contaminant removal mode) and one is in regeneration mode, 330. Although three adsorbent bed containing vessels are shown in FIG. 3, in certain embodiments, the number of adsorbent bed containing vessels may range from any of 3, 4, 5, or 6 to any of 7, 8, 9, or 10. Regardless of the number of adsorbent bed containing vessels, at any given time, at least two adsorbent bed containing vessels will be in adsorption mode and at least one of the adsorbent bed containing vessels will be in regeneration mode for purposes of the embodiments contemplated herein. The vessels in the dehydration and/or contaminant removal unit alternate between being in adsorption mode (or dehydration mode and/or contaminant removal mode) and being in regeneration mode throughout a complete dehydration and/or contaminant removal cycle, as will be described in further detail below. The pressure and temperatures described with respect to FIG. 2 all apply to the embodiments shown in FIG. 3, unless stated otherwise.

In FIG. 3, each of the adsorbent bed containing vessels that are in adsorption mode, 310 and 320, have a feed gas inlet, 310I and 320I, respectively. Similarly, each of the adsorbent bed containing vessels, 310 and 320, have a dried gas outlet, 310O and 320O, respectively. The adsorbent bed containing vessel that is in regeneration mode, 330, also has a regeneration gas 330I inlet and a regeneration gas 330O outlet. Vessels 310 and 320 are shown in adsorption mode (e.g., dehydration and/or contaminant removal mode) and operate similarly to vessels 210 and 220, depicted in FIG. 2. Vessel 330 is shown in regeneration mode and operates similarly to vessel 230, depicted in FIG. 2.

The adsorbent is regenerated in vessel 230 at high temperature by flowing a regeneration gas 330I over the bed of adsorbent material in vessel 330. The regeneration gas 330I is typically initiated by taking a slip stream of filtered dried process gas (as shown for slip stream 100S in FIG. 1). In the embodiments contemplated herein, the slip stream 300S is a portion of the filtered dried process gas exiting from vessel 320 (320O or 300D).

In certain embodiments, the slip stream 300S acts as regeneration gas for vessel 330 which is in regeneration mode. Slip stream 300S may be heated via heater 350 to a temperature sufficient to desorb water and/or contaminants (e.g., heavy hydrocarbons such as C5+ hydrocarbons) from the saturated adsorbent material and is passed to the regeneration gas 330I inlet of the vessel in regeneration mode such that the slip stream is used as a regeneration gas for passing over and thereby desorbing water and/or contaminants from the adsorbent material within the vessel 330.

The regeneration gas then leaves the vessel 330 and may be cooled via condenser 370 in communication with the regeneration gas 330O outlet of the vessel 330 for cooling an overhead stream from the regeneration gas 330O outlet to form a stream containing water and/or hydrocarbon liquids and gas. The regeneration gas 330O passes to a separator 360 where free water and/or hydrocarbon liquids 330W are separated and removed and a regeneration gas stream 360O, also referred to as the regeneration gas stream, is formed. Rather than compressing the regeneration gas stream 360O via compressor 340, as done in a conventional dehydration and/or contaminant removal systems (such as shown in FIG. 1), the regeneration gas stream 360O is introduced into the inlet of adsorbent bed containing vessel 310 that is in adsorption mode to generate a second product stream 310O. In one embodiments, compressor 340 may be omitted altogether from the dehydration and/or contaminant removal system 300. In alternative embodiments, compressor 340 may be bypassed, e.g., via bypass stream 360B. For example, if compressor 340 is out of repair or is undergoing maintenance, system 300 can remain operational by bypassing compressor 340 via bypass stream 360B. The second product stream 310O is combined with a portion of the first product stream 320O (or 300D) which was not redirected into the slip stream 300S. The combination of these streams constitutes the dried product gas 300P.

The difference between the embodiment depicted in FIG. 2 and the embodiment depicted in FIG. 3, is that regeneration gas stream 360O is first combined with an additional gas feed stream 310F, and the combination is introduced as inlet stream 310I into adsorbent bed containing vessel 310.

Similar to the embodiment depicted in FIG. 2, the first adsorbent bed containing vessel 310 that is in adsorption mode has a low pressure P3, the second adsorbent bed containing vessel 320 that is in adsorption mode has a high pressure P1, and the third adsorbent bed containing vessel 330 has a pressure P2 (whether P2h or P2c) that is an intermediate pressure between P1 and P3 such that P1>P2 (whether P2h or P2c)>P3. In this manner, the system illustrated in FIG. 3 is configured to introduce a gas feed stream 320F (or 320I) into vessel 320 (a high pressure adsorbent bed containing vessel in adsorption mode having a pressure P1); subsequently, pass a slip stream 300S of the first product stream 320O (or 300D) into vessel 330 (an adsorbent bed containing vessel in regeneration mode on heating having a pressure P2h) such that the slip stream 300S is used as a regeneration gas 330I for vessel 330; and subsequently, combine the regeneration gas from the outlet stream of vessel 330 (330O) with an additional gas feed stream 310F followed by introducing the combined stream 310I into vessel 310 (a low pressure adsorbent bed containing vessel in adsorption mode having a pressure P3), without the regeneration gas 330O (or 360O) passing through a compressor between the outlet of vessel 330 and the inlet of vessel 310. After passing through vessel 310, a second product stream 310O is generated.

This description refers to a scenario when vessel 330 is an adsorbent bed containing vessel in regeneration mode on heating having a pressure P2h. In certain embodiments, following regeneration of a vessel, the vessel is cooled. The skilled artisan would understand that in the cooling step, regeneration gas follows nearly the same path as during regeneration, except that the regeneration gas bypasses the heater, e.g., via bypass stream 330B, such that cool regeneration gas is passed into the adsorbent bed containing vessel 330 to return it to a temperature that is appropriate for adsorption. Hence, a description similar to the one provided for the heating scenario, would also apply to a scenario when vessel 330 is an adsorbent bed containing vessel in regeneration mode on cooling having a pressure P2c.

Similarly, the skilled artisan would understand that a similar description would also apply to a scenario when vessel 330 is an adsorbent bed containing vessel in regeneration mode on heating having a pressure P2h and when there is an additional adsorbent containing vessel in regeneration mode on cooling having a pressure P2c.

One or more additional flow controllers, each positioned proximate to a corresponding inlet stream (e.g., 310I, 320I, and any additional inlet streams if additional adsorbent bed containing vessels in adsorption mode are present) into one or more vessels (310, 320, any additional vessels if additional adsorbent bed containing vessels in adsorption mode are present, respectively), may be included in the system shown in FIG. 3. The one or more additional flow controllers may be configured to split the flows into the various inlet streams to account for the regeneration gas that is being introduced into some of the inlet streams. For instance, the flow controllers may adjust the stream 320F or 320I to be approximately the same as stream 310I (which includes the combination of stream 360O and 310F).

The systems contemplated herein may be further configured to adjust the pressure in the various adsorbent bed containing vessels cyclically. One example is shown in Table 1 below for a scenario when there are four adsorbent bed containing vessels in a dehydration and/or contaminant removal unit, such that the adsorbent bed containing vessels are:

(a) a high pressure adsorbent bed containing vessel in adsorption mode having a high pressure P1;

(b) a low pressure adsorbent bed containing vessel in adsorption mode having a low pressure P3; (c) an adsorbent bed containing vessel in regeneration mode on heating having an intermediate pressure P2h; and (d) an adsorbent bed containing vessel in regeneration mode on cooling having an intermediate pressure P2c (which may or may not be the same as intermediate pressure P2h of vessel (c)).

TABLE 1

Cyclical Pressure Adjustment of Each Vessel in
a Dehydration and/or Contaminant Removal Unit

|  | Step 1 | Step 2 | Step 3 | Step 4 |
| --- | --- | --- | --- | --- |
| Vessel (a) | P1 | P3 | P2h | P2c |
| Vessel (b) | P3 | P2h | P2c | P1 |
| Vessel (c) | P2h | P2c | P1 | P3 |
| Vessel (d) | P2c | P1 | P3 | P2h |

As shown in Table 1, a vessel that is in adsorption mode and has a high pressure P1 in a first step, will have its pressure adjusted to low pressure P3 in a subsequent step. In adsorption mode and at high pressure P1, the vessel may receive a feed gas (without a regeneration gas stream). In adsorption mode and at low pressure P3, the vessel may receive the regeneration gas stream (optionally combined with a gas feed stream per the embodiment in FIG. 3). After a vessel being in adsorption mode and at low pressure P3, the vessel becomes saturated with water and/or contaminants and transitions to operating in regeneration mode at pressure P2h to be regenerated for a period of time to remove the water and/or hydrocarbon liquids. Thereafter, a vessel transitions to operating in regeneration mode at pressure P2c to cool down for a period of time until it reaches a temperature suitable for operation in adsorption mode at high pressure P1 again.

In other words, vessel (a) in the first step becomes vessel (b) in the second step in terms of pressure (and temperature); vessel (b) in the first step becomes vessel (c) in the second step in terms of pressure (and temperature); vessel (c) in the first step becomes vessel (d) in the second step in terms of pressure (and temperature); vessel (d) in the first step becomes vessel (a) in the second step in terms of pressure (and temperature).

The regeneration gas that enters the vessel that operates in adsorption mode and at low pressure refers to a gas stream that has been introduced into at least one other bed in adsorption mode (e.g., the vessel operating in adsorption mode and at high pressure) and is entering into a vessel in which all portions of the bed therein are at a temperature that is at least 75° C. lower than the regeneration temperature.

The systems contemplated herein may be further configured to adjust the pressure in the various adsorbent bed containing vessels cyclically. Another example is shown in Table 2 below for a scenario when there are four adsorbent bed containing vessels in a dehydration and/or contaminant removal unit, such that the adsorbent bed containing vessels are:

(a) a high pressure adsorbent bed containing vessel in adsorption mode having a high pressure P1;

(b) a low pressure adsorbent bed containing vessel in adsorption mode having a low pressure P3;

(c) an adsorbent bed containing vessel in regeneration mode on heating having an intermediate pressure P2h; and (d) an adsorbent bed containing vessel in regeneration mode on cooling having an intermediate pressure P2c (which may or may not be the same as intermediate pressure P2h of vessel (c)).

TABLE 2

Cyclical Pressure Adjustment of Each Vessel in
a Dehydration and/or Contaminant Removal Unit

|  | Step 1 | Step 2 | Step 3 | Step 4 |
| --- | --- | --- | --- | --- |
| Vessel (a) | P3 | P1 | P2h | P2c |
| Vessel (b) | P1 | P2h | P2c | P3 |
| Vessel (c) | P2h | P2c | P3 | P1 |
| Vessel (d) | P2c | P3 | P1 | P2h |

As shown in Table 2, a vessel that is in adsorption mode and has a low pressure P3 in a first step, may have its pressure adjusted to high pressure P1 in a subsequent step. In adsorption mode and at high pressure P1, the vessel may receive a feed gas (without a regeneration gas stream). In adsorption mode and at low pressure P3, the vessel may receive the regeneration gas stream (optionally combined with a gas feed stream per the embodiment in FIG. 3).

In the example shown in Table 2, after a vessel being in adsorption mode and at high pressure P1, the vessel becomes saturated with water and/or contaminants and transitions to operating in regeneration mode at pressure P2h to be regenerated for a period of time to remove the water and/or hydrocarbon liquids. Thereafter, a vessel transitions to operating in regeneration mode at pressure P2c to cool down for a period of time until it reaches a temperature suitable for operation in adsorption mode at low pressure P3 again.

In other words, vessel (a) in the first step becomes vessel (b) in the second step in terms of pressure (and temperature); vessel (b) in the first step becomes vessel (c) in the second step in terms of pressure (and temperature); vessel (c) in the first step becomes vessel (d) in the second step in terms of pressure (and temperature); vessel (d) in the first step becomes vessel (a) in the second step in terms of pressure (and temperature).

The systems described with respect to FIGS. 2 and 3 may be operated in accordance with a process that includes, in certain embodiments, introducing a gas feed stream (in FIG. 2, 200F, 220I or in FIG. 3, 320F, 320I) to a first adsorbent bed containing vessel in adsorption mode (in FIG. 2, 220 or in FIG. 3, 320) to generate a first product stream (in FIG. 2, 220O, 200D or in FIG. 3, 320O, 300D). The process may further include passing a slip stream (in FIG. 2, 200S or in FIG. 3, 300S) from the first product stream into a second adsorbent bed containing vessel in regeneration mode (in FIG. 2, 230 or in FIG. 3, 330) such that the slip stream is used as a regeneration gas for the second adsorbent bed containing vessel.

In certain embodiments, when the second adsorbent bed containing vessel is on heating, the process may include heating the slip stream, by passing it through a heater (in FIG. 2, 250 or in FIG. 3, 350) prior to introducing it into the second adsorbent bed containing vessel in regeneration mode on heating.

In certain embodiments, the process includes condensing the regeneration gas stream exiting from the second adsorbent bed containing vessel (in FIG. 2, 230O or in FIG. 3, 330O), by passing it through a condenser (in FIG. 2, 270 or in FIG. 3, 370), followed by separating the water and/or hydrocarbon liquids and gas, in a separator (in FIG. 2, 260 or in FIG. 3, 360), from the regeneration gas stream exiting from the second adsorbent bed containing vessel to form a water and/or hydrocarbon liquids stream (in FIG. 2, 230W or in FIG. 3, 330W) and a regeneration gas stream (in FIG. 2, 260O or in FIG. 3, 360O).

In certain embodiments, the process further includes introducing the regeneration gas stream exiting from the second adsorbent bed containing vessel, whether it has been condensed and/or separated in a separation unit or not, into a third adsorbent bed containing vessel in adsorption mode (in FIG. 2, 210 or in FIG. 3, 310) to generate a second product stream (in FIG. 2, 210O or in FIG. 3, 310O). In certain embodiments, the regeneration gas introduced into the third adsorbent bed containing vessel in adsorption mode to generate a second product stream does not pass through a compressor (e.g., bypasses a compressor that may, for instance, be out of order) between the outlet from the second adsorbent bed containing vessel (that is in regeneration mode) and the inlet to the third adsorbent bed containing vessel (that is in adsorption mode).

In certain embodiments, the process steps of using a portion of a product gas exiting from one vessel (operating in adsorption mode), as regeneration gas to heat or cool a second vessel (operating in regeneration mode on heating or cooling), and re-routing said regeneration gas to a third vessel (operating in adsorption mode), without passing the regeneration gas exiting from the second vessel through a compressor, may be repeated a number of times that corresponds to the number of adsorbent bed containing vessels operating in adsorption mode, until a final product stream is generated. The number of adsorbent bed containing vessels operating in adsorption mode may range from 2 to 10, from 2 to 8, from 2 to 6, or from 2 to 4.

Ultimately, the process includes combining all product stream portions that were not routed into the slip stream to act as regeneration gases, to form the final product stream.

The processes and systems described herein with respect to their application in removing water to dry natural gas should not be construed as limited to the natural gas industry. The skilled artisan would understand that the processes and systems described herein may be utilized in other industrial applications. Exemplary suitable industrial applications may be ones where it is advantageous to remove contaminants, such as water and/or heavy hydrocarbons (e.g., C5+ hydrocarbons). In one embodiment, the processes and systems described herein are suitable for natural gas feeds. In one embodiment, the processes and systems described herein are suitable for olefin streams. In one embodiment, the processes and systems described herein are suitable for wet air feeds. In certain embodiment, the processes and systems described herein are suitable for at least one of natural gas feeds, olefin streams, or wet air feeds.

It should also be understood that a variety of adsorbents may be utilized in the processes and systems described herein. Suitable adsorbents may include, without limitations, one or more of an amorphous silica adsorbent (optionally with other components such as adsorbed cations), an amorphous silica-alumina adsorbent (optionally with other components such as adsorbed cations), a high-silica zeolite adsorbent (such as beta zeolite, ZSM-5, Y zeolite, or combinations thereof), zeolite A (e.g., zeolite 3A, zeolite 4A, zeolite 5A, or a combination thereof), zeolite X (e.g., zeolite 13X, which is zeolite X that has been exchanged with sodium ions), zeolite Y, alumina, or a combination thereof. In some embodiments, the zeolite is exchanged with any element of columns I and II of the periodic table, such as Li, Na, K, Mg, Ca, Sr, or Ba. As used herein, "high-silica zeolite" refers to a material having a silica-to-alumina ratio, on a molar basis, of at least 5, of at least 10, of at least 20, at least 30, at least 50, at least 100, at least 150, at least 200, at least 250, at least 300, at least 350, at least 400, at least 450, or at least 500. In some embodiments, the silica to alumina ratio is in the range of from 20 to 500. Non-limiting exemplary adsorbents may include one or more of Durasorb™ BTX, Durasorb™ HC, or Durasorb™ AR.

It should be noted that only the components relevant to the disclosure are shown in the figures, and that many other components normally part of a gas dehydration system and/or contaminant removal system are not shown for simplicity.

The term "configured" as used in the description and claims is intended to be an open-ended term as are the terms "comprising" or "containing". The term "configured" is not meant to exclude other possible elements. The term "configured" may be equivalent to "adapted".

The systems shown in the FIGs and described herein should not be construed as limited only to the processing units that are depicted. Other processing units may also be part of systems according to certain embodiments. Examples of other processing units include, without limitations, one or more heat exchangers, additional compressors, expanders, turbo-expanders, Joule-Thompson valves, columns, reboilers, condensers, reflux drums, temperature controllers, coolers, heaters, separators, knock-out pots, valves and the like.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "some embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more implementations.

Although the embodiments disclosed herein have been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

In addition, the term "or" is intended to mean an inclusive "or" rather than an exclusive "or." When the term "about" or "approximately" is used herein, this is intended to mean that the nominal value presented is precise within ±10%.

What is claimed is:

1. A process comprising:
   (a) introducing a gas feed stream to a first adsorbent bed containing vessel in adsorption mode to generate a first product stream;
   (b) passing a slip stream from the first product stream into a second adsorbent bed containing vessel in regeneration mode such that the slip stream is used as a regeneration gas for the second adsorbent bed containing vessel; and
   (c) introducing the regeneration gas from an outlet stream of the second adsorbent bed containing vessel into a third adsorbent bed containing vessel in adsorption mode to generate a second product stream,
   wherein the first adsorbent bed containing vessel in adsorption mode has a first pressure (P1),
   wherein the second adsorbent bed containing vessel in regeneration mode has a second pressure (P2),
   wherein the third adsorbent bed containing vessel in adsorption mode has a third pressure (P3), and
   wherein P2 is an intermediate pressure between P1 and P3 such that P1>P2>P3.

2. The process of claim 1, wherein all portions of the first bed in the first adsorbent bed containing vessel and all portions of the third bed in the third bed containing vessel, in adsorption mode, have a temperature that is at least 75° C. lower than the temperature of the second bed in the second adsorbent bed containing vessel that is in regeneration mode.

3. The process of claim 1, further comprising:
   after (b), combining an additional gas feed stream with the regeneration gas from the outlet stream of the second adsorbent bed containing vessel; and
   in (c), introducing the combination of the regeneration gas from the outlet stream of the second adsorbent bed containing vessel and the additional gas feed stream into the third adsorbent bed containing vessel.

4. The process of claim 1, further comprising heating the slip stream prior to passing the slip stream into the second adsorbent bed containing vessel in regeneration mode.

5. The process of claim 1, further comprising:
   prior to (c), condensing water and/or hydrocarbon liquids from the regeneration gas in the outlet stream of the second adsorbent bed containing vessel; and
   separating the water and/or hydrocarbon liquids and gas from the outlet stream to form a water and/or hydrocarbon liquids stream and a regeneration gas stream.

6. The process of claim 1, wherein the regeneration gas being introduced into the third adsorbent bed containing vessel does not pass through a compressor between the outlet from the second adsorbent bed containing vessel and an inlet to the third adsorbent bed containing vessel.

7. The process of claim 6, wherein the regeneration gas bypasses a compressor that is out of order between the outlet of the second adsorbent bed containing vessel and an inlet to the third adsorbent bed containing vessel.

8. The process of claim 1, further comprising repeating (b) through (c) a number of times that corresponds to a number of adsorbent bed containing vessels in adsorption mode until a final product stream is generated.

9. The process of claim 8, wherein the number of adsorbent bed containing vessels in adsorption mode range from 2 to 10.

10. The process of claim 9, further comprising combining the final product stream with portions of the first product stream not passed in the slip stream as a regeneration gas.

11. The process of claim 1, wherein the gas feed stream is at least one of natural gas feed, olefin stream, or wet air feed.

12. A process implemented using an adsorption system, the process comprising:
    cycling four or more adsorbent bed containing vessels in a system from (a) through (d), wherein:
    (a) comprises a high pressure adsorbent bed containing vessel in adsorption mode having a pressure P1;
    (b) comprises a low pressure adsorbent bed containing vessel in adsorption mode having a pressure P3;
    (c) comprises an adsorbent bed containing vessel in regeneration mode on heating having a pressure P2$h$; and
    (d) comprises an adsorbent bed containing vessel in regeneration mode on cooling having a pressure P2$c$,
    wherein P2$h$ and P2$c$ are an intermediate pressure between P1 and P3 such that P1>P2$h$>P3 and P1>P2$c$>P3.

13. The process of claim 12, wherein cycling comprises at any given cycle:
    introducing a gas feed stream into (a) to generate a first product stream;
    subsequently, passing a slip stream of the first product stream into at least one of (c) or (d) such that the slip stream is used as a regeneration gas for at least one of (c) or (d); and
    subsequently, introducing the regeneration gas from an outlet stream of at least one of (c) or (d) into (b), without passing the regeneration gas through a compressor, to generate a second product stream.

14. The process of claim 12, wherein cycling comprises adjusting the pressure in the four or more beds in the adsorption system such that:
    (a) in a first step becomes (b) in a second step;
    (b) in the first step becomes (c) in the second step;
    (c) in the first step becomes (d) in the second step; and
    (d) in the first step becomes (a) in the second step.

15. The process of claim 12, wherein cycling comprises adjusting the pressure in the four or more beds in the adsorption system such that:
    (b) in a first step becomes (a) in a second step;
    (a) in the first step becomes (c) in the second step;
    (c) in the first step becomes (d) in the second step; and
    (d) in the first step becomes (b) in the second step.

16. An adsorption system comprising:
    (a) a high pressure adsorbent bed containing vessel in adsorption mode having a pressure P1;
    (b) a low pressure adsorbent bed containing vessel in adsorption mode having a pressure P3; and
    at least one of:
    (c) an adsorbent bed containing vessel in regeneration mode on heating having a pressure P2$h$; and
    (d) an adsorbent bed containing vessel in regeneration mode on cooling having a pressure P2$c$,
    wherein P2$h$ and P2$c$ are an intermediate pressure between P1 and P3 such that P1>P2$h$>P3 and P1>P2$c$>P3;
    wherein the system is configured to:
    introduce a gas feed stream into (a) to generate a first product stream;

subsequently, pass a slip stream of the first product stream into at least one of (c) or (d) such that the slip stream is used as a regeneration gas for at least one of (c) or (d); and subsequently, introduce the regeneration gas from an outlet stream of at least one of (c) or (d) into (b), without the regeneration gas passing through a compressor between an outlet of (c) or (d) and an inlet of (b), to generate a second product stream.

17. The adsorption system of claim 16, wherein all portions of the bed in (a) and all portions of the bed (b) have a temperature that is at least 75° C. lower than the temperature of the bed in (c) and (d).

18. The adsorption system of claim 16, further configured to adjust the pressure in (a) through (d) cyclically such that:
(a) in a first step becomes (b) in a second step;
(b) in the first step becomes (c) in the second step;
(c) in the first step becomes (d) in the second step; and
(d) in the first step becomes (a) in the second step.

19. The adsorption system of claim 16, further configured to adjust the pressure in (a) through (d) cyclically such that:
(b) in a first step becomes (a) in a second step;
(a) in the first step becomes (c) in the second step;
(c) in the first step becomes (d) in the second step; and
(d) in the first step becomes (b) in the second step.

20. The adsorption system of claim 16, wherein the system is further configured to:
combine an additional gas feed stream with the regeneration gas from the outlet stream of at least one of (c) or (d); and
subsequently, introduce the combination of the regeneration gas from the outlet stream of at least one of (c) or (d) and the additional gas feed stream into (b).

* * * * *